No. 624,999. Patented May 16, 1899.
H. WALLIN.
SCREW DRIVER.
(Application filed May 18, 1898.)
(No Model.)
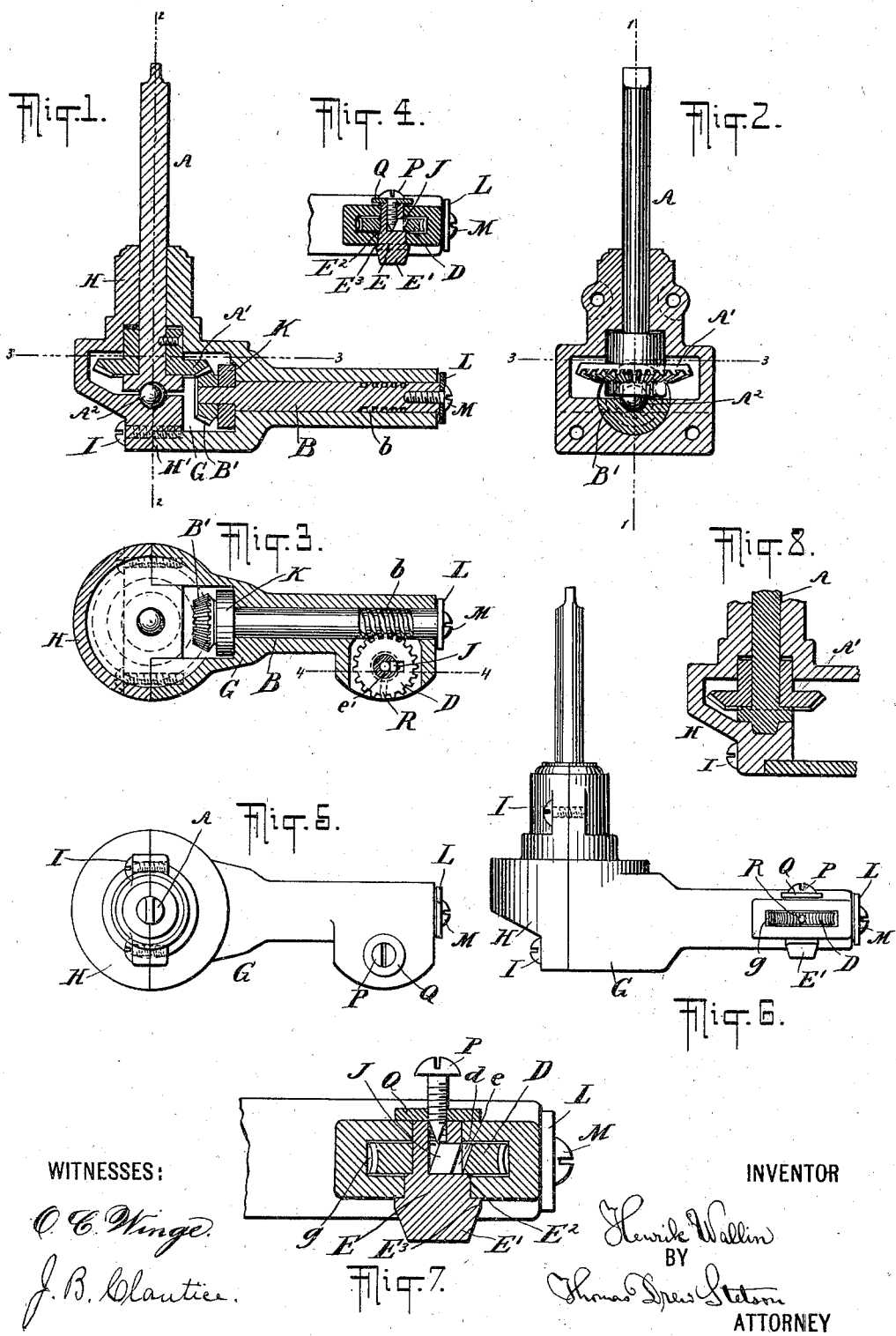
WITNESSES:
INVENTOR
Henrik Wallin
BY
Thomas Drew Stetson
ATTORNEY

UNITED STATES PATENT OFFICE.

HENRIK WALLIN, OF NEW YORK, N. Y.

SCREW-DRIVER.

SPECIFICATION forming part of Letters Patent No. 624,999, dated May 16, 1899.

Application filed May 18, 1898. Serial No. 681,026. (No model.)

*To all whom it may concern:*

Be it known that I, HENRIK WALLIN, a citizen of the United States, residing in the borough of Manhattan, in the city and State of New York, have invented a certain new and useful Improvement in Screw-Drivers, of which the following is a specification.

My improvement is especially intended for use in seating, driving, or unscrewing screws in scrollwork and in other situations where an ordinary screw-driver cannot be used. My machine is useful also in situations where, although there may be ample room for the screw, there is not room properly presented for a screw-driver of proper length for turning it. My screw-driver is provided with gearing peculiarly arranged. I make a small and compact casing which incloses a short driven shaft having proper bearings and a chisel end to engage the score of the screw, and I provide for working this by a laterally-extending shaft. The motion is received from a shaft which is alternately rotated in opposite directions by reciprocating a block on a quick-screw-threaded shaft in a long-approved manner. There may be the ordinary click, allowing such to rotate idly in one direction, and thus transform the turning alternately into a turning intermittently and ordinary provision for receiving the action of such driving means. I employ a worm and worm-wheel, so arranged that a light lateral shaft will give the required strong rotation to the screw in the last part of its being driven home or in the first part of its withdrawal. My machine operates very rapidly and effectively, performing in an almost inappreciably short period of time work which would require several minutes when performed with an L-shaped screw-driver ordinarily employed for applying and removing screws in these situations.

The accompanying drawings form a part of this specification and represent what I consider the best means for carrying out the invention.

Figure 1 is a central section on the line 1 1 in Fig. 2. Fig. 2 is a section on the line 2 2 in Fig. 1. Fig. 3 is a section on the line 3 3 in Figs. 1 and 2 with the large horizontal wheel removed. Fig. 4 is a section on the line 4 4 in Fig. 3. Fig. 5 is a plan view corresponding to Fig. 3. Fig. 6 is a side elevation corresponding to Fig. 1. Fig. 7 is on a larger scale. It is a section corresponding to Fig. 4, but showing the key before it is moved outward, leaving the wheel and shaft disconnected. Fig. 8 shows a modification. It is a section corresponding to a portion of Fig. 1. The figures show all the parts involving novelty.

Similar letters of reference indicate corresponding parts in all the figures where they appear.

A is the receiving-shaft, turned by the operator intermittently. $A'$ is the bevel gear-wheel fixed thereon, and $A^2$ is a center or support formed by a steel ball $A^3$, which is partially received in a cavity in the end of the shaft A. The ball and the recesses are properly finished, the recesses having a slightly-larger radius than the ball. It serves in a manner somewhat analogous to that in which a series of balls serve in what are termed "ball-bearings." This shaft A, rotated intermittently in the proper directions, communicates a corresponding but quicker motion from the gear-wheel $A'$ to a somewhat smaller bevel gear-wheel $B'$, keyed on a laterally-extending shaft B, which latter is provided with a slow screw-thread $b$, which, the shaft being supported against end motion by a finished ring K, let into the housing G at one end, and by a washer L and screw M at the other end, serves as a worm to impart a strong intermittent rotary motion to a worm-wheel D. This latter, when in use, is firmly engaged with a short driven shaft E. The end $E'$ of this shaft is properly formed to engage with the screw which is to be driven. For ordinary wood-screws, sometimes called "screw-nails," the end is simply flattened or reduced to a "chisel" of the proper thickness. The intermittent quick revolving of the shaft A is effected in the well-known manner through the aid of a ratchet (not shown) by the attendant giving an active reciprocating motion to a suitable internally-threaded handle acting on a quick-threaded shaft engaged with the shaft A, which communicates an intermittent slower but stronger forward motion in one direction to the short shaft E, and thus to the screw which is engaged by the end $E'$. It remains to show how these shafts are held in the proper relation and the device made into a conveniently-portable tool.

I provide a casing in two parts G and H, which may be cheaply and strongly made of malleable cast-iron or any other material fit for that purpose. The shaft B is entirely and the shaft E is mainly inclosed in the part G. A sufficient length of the lower portion of the shaft A finds a bearing in the matched semicylindrical cavities properly finished in the adjacent faces of the parts G and H. These latter parts are not only secured together by screws I, but are also strengthened and defended against lateral displacement relatively to each other by extending a portion H' of the part H into the cavity $g$ in the part G.

The engagement of the shaft E with the worm-wheel D is effected by means of a thin broad key J, by the aid of a deep spline-groove $e$ in the shaft E, deepest at the upper end, and a corresponding spline-groove $d$ in the wheel D, deepest at the lower end. The key has its outer and inner edges correspondingly inclined and is urged outward by a screw P, having a conical end.

R is a headless set-screw tapped radially into the wheel D, and when turned so as to move it inward sufficiently engaging its inner end in a separate shallow spline $e$ in the shaft E. The length is carefully determined, so that when the screw is "home" its outer end will be sunk entirely out of the way of the worm $b$.

The lower end of the shaft E is larger than the upper end, and the hole which receives it in the housing G is correspondingly proportioned. The change of diameter is made by a shoulder or offset $E^2$, which applies below the wheel D and firmly holds the parts in their correct relation. Below the bottom of the housing the shaft E is further enlarged by a shoulder $E^3$. The shoulder $E^2$ forms a stop for the wheel D and enables it to be firmly locked by the depression of the key by the screw. The shoulder $E^3$ enables the shaft to withstand the considerable pressure upward to which it is subjected when the device is pressed strongly down upon a screw. A washer Q, a little larger than the small part of the shaft E, is applied under the head of the screw P, and this, matching on or recessed into the upper face of the housing G, resists any force which may tend to displace the shaft E downward.

The shaft B need not have a large diameter and the wheel D may obviously be quite thin. The device may be constructed with very little length in the short shaft E, and the housing for that portion being in a single piece may have correspondingly small dimensions, so that my device may apply screws in spaces where there is but very little height. My construction allows the easy assembling and separating of the parts.

In applying the parts together the worm-wheel D is pushed into the open slot $g$ until its toothed periphery engages properly with the worm $b$. Then the parts being held in position to avoid displacement by gravity the key J is laid in the deep spline groove or seat $e$, and the shaft E, with its key, may then be inserted properly in place. Then holding the shaft E temporarily the washer Q is applied and the screw P inserted and turned down, the effect of this latter being both to hold the shaft E up in its place and to press the key J outward, and by reason of the inclination of the inner edge of the key J this movement, by acting wedgewise by its tapering point on the inner inclined surface, forces that key out into engagement with the spline-groove $d$ in the interior of the wheel D. When the screw is thus forced home, the parts D and E are firmly united and may be worked for any period as a unit. When it is desired to separate these parts, the reverse operation will liberate the key. After the slackening or the entire removal of the screw P the shaft E may be moved directly downward, and such movement will, by reason of the taper of the spline-groove $d$ in the wheel D, urge the key J inward and hold it entirely in the deep spline $e$ in the shaft E.

I attach importance to the ball-bearing having the single ball $A^2$, as shown, because it gives a reliable support to the shaft A both laterally and endwise and by its rolling receives the strain and allows the required motions with very little friction or wear.

Modifications may be made without departing from the principle or sacrificing the advantages of the invention. The casing G H may have special forms to adapt it to be conveniently held by the hand and to exert the required pressure thereon to hold the end of the shaft E in reliable engagement with the screw, but I prefer the simple form shown.

Parts of the invention may be used without the whole. The headless screw R in the wheel D and the corresponding spline-groove $e'$ in the shaft E may be omitted or there may be two or more such screws distributed around the periphery of the wheel D, each engaging with a corresponding spline-groove in the shaft. If these are made sufficiently strong and numerous to constitute of themselves a sufficient fastening, the key J and the deep spline-grooves $d$ and $e$ may be omitted. In such case the screw M will perform only the function of holding the washer L and the shaft E in position.

I claim as my invention—

1. In a screw-driver, the combination with a casing comprising the sections G, H, the former having an elongated horizontal body portion containing an extended shaft-bearing, extending entirely therethrough at both ends, and provided at one end with a bearing-chamber and at the other with a partial chamber and vertical bearing completed by the section H, a driven stub-shaft E in the first-mentioned bearing-chamber and having a screw-engaging end, a driving-shaft B, in gear therewith, located within the elongated body portion and extending at one end into the sectional chamber and secured at the other by a screw and washer, gearing within the sectional chamber and means for actuating said gearing to drive the shaft B, substantially as herein specified.

2. In a screw-driver, the combination with a casing comprising the sections G, H, the former having an elongated horizontal body portion containing an extended shaft-bearing extending entirely therethrough at both ends, and provided at one end with a bearing-chamber and at the other with a partial chamber and vertical bearing completed by the section H, a driven stub-shaft E having a screw-engaging end and a large lower part to resist upward displacement, the washer Q and screw P at its upper end to resist downward displacement, a driving-shaft B, in gear with the stub-shaft and located in the elongated bearing gearing having its ends clamped at the respective ends of the section G, and means for actuating the same to drive the shaft B, substantially as herein specified.

3. In a screw-driver having a receiving-shaft A, lateral shaft B, keyed gear-wheel D and pawl-driven shaft E, with provisions for communicating the motion through the whole the driven shaft E engaging the screw to be operated having the large lower part $E^3$ to resist upward displacement and the washer Q and screw P at its upper end adapted to resist downward displacement, the casing G in a single piece forming a bearing and protection for said shaft, and the single screw P arranged to perform the double function of holding down such washer and holding out the key, all combined and arranged to serve substantially as herein specified.

4. In a screw-driver having a receiving-shaft A, lateral shaft B and pawl-driven shaft E, with provisions for communicating motion through the whole, the casing G, H, in only two parts secured together and confining the several shafts, the part H having an extension H' entering the part G to strengthen the engagement of said parts and constitute a thrust-bearing for the shaft A, substantially as herein specified.

5. In a screw-driver having a receiving-shaft A, lateral shaft B, wheel D, having the inclined spline-groove $d$, the driven shaft E with the key-recess $c$ and lower shoulder $E^2$, said shaft E engaging the screw to be operated, and provisions for communicating motion through the whole, including a key J and adjusting-screw P for moving the key into the said spline-groove, between the shaft-shoulder and the casing to lock the gear-wheel and the shaft E, substantially as herein specified.

In testimony that I claim the invention above set forth I affix my signature in presence of two witnesses.

HENRIK WALLIN.

Witnesses:
J. B. CLAUTICE,
M. F. BOYLE.